D. SHIVE.
Enlarging Photographs.
No. 2,198.
Reissued March 13, 1866.
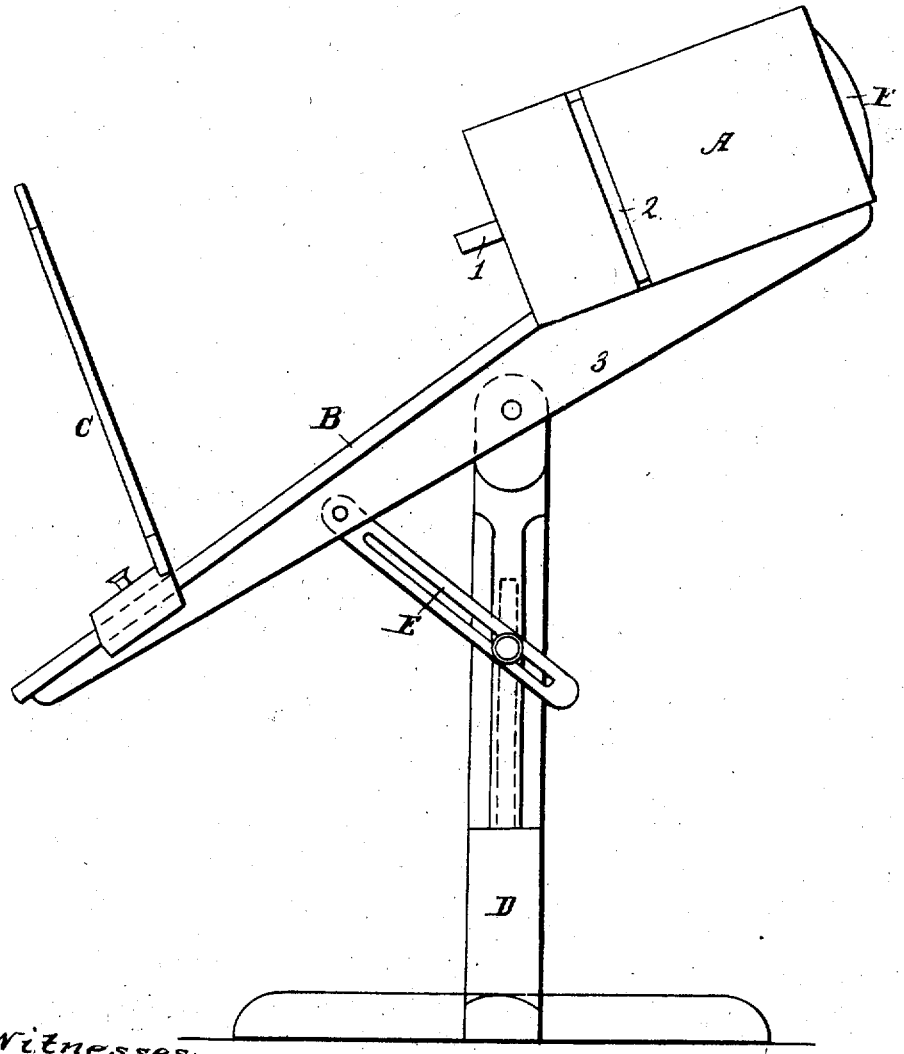
Witnesses:
Ruy Morton
M. A. Kelley
Inventor:
David Shive

UNITED STATES PATENT OFFICE.

DAVID SHIVE, OF PHILADELPHIA, PENNSYLVANIA.

INSTRUMENT FOR ENLARGING PHOTOGRAPHS.

Specification forming part of Letters Patent No. 23,316, dated March 22, 1859; Reissue No. 2,198, dated March 13, 1866.

*To all whom it may concern:*

Be it known that I, DAVID SHIVE, of Philadelphia, in the county of Philadelphia and State of Pennsylvania, have invented new and useful Improvements in Photographic Instruments; and I do hereby declare that the following is a full, clear, and exact description thereof, which will enable others skilled in the art to make and use the same, reference being had to the the accompanying drawing, forming a part of this specification.

The nature of the present invention consists in the arrangement of an illuminating lens, in the usually open end of a photographic camera, (or that end of the box which is directly opposite to the usual tubular end containing the magnifying lens or lenses,) which camera is secured upon a rigid board or plane having an adjustable sliding support for holding the photographic paper at right angles to the focal axis of the said lenses and at any suitable distance therefrom, the whole being so hung or swiveled upon any suitable stand as to admit of its being readily adjusted to bring and keep the focal line of the lenses in direct line with the sun, thus entirely dispensing with the reflector heretofore required for illuminating the usual translucent negative picture and producing the photographic effect upon the paper, and also enabling the direct rays of the sun to be readily and continuously converged upon the said picture in such a manner as to greatly increase the degree of illumination above that afforded by the reflector usually employed, consequently proportionally shortening the time required to produce an enlarged photograph or the photographic result upon the paper, and therefore effecting a much more perfect result.

In accompanying plate my improved photographic instrument is illustrated in a skeleton form, the figure being an elevation of one side of the same and its stand.

A in the drawings represents a box fitted with a tube, 1, containing the usual lens, and also with a slot, 2, through which the translucent negative picture is to be inserted. This box A is fixed upon a board or frame stiffened by ribs 3, (as seen in the drawings,) and upon which is arranged and adapted to slide toward and away from the box A a paper-holder, C, in such a manner as to constantly preserve a parallelism between the paper which it is designed to support and the tube end of the said box A. The whole is so hung or swiveled upon a stand, D, as to be readily adjusted vertically and also horizontally thereon, as occasion may require, to bring and keep the focal line of the lenses longitudinally in a direct line with the sun, and thus dispense with the use of a mirror or reflector, as has been heretofore used to reflect the sun's rays into the box for illuminating the negative picture, the swing of the instrument in a vertical plane being secured by hanging it upon a pin, *a*, of the upright or shaft *b* of the stand D, and in a horizontal plane, by hanging the said shaft *b* in such a manner upon and in the fixed portion *f* of the base-plate *c* of the stand D that it can freely turn around and in the same.

E is an adjustable stay-brace, having a set-screw, *g*, for holding the instrument at any inclination that the position of the sun may from time to time require it to be adjusted to preserve the focal line of the lenses, as above stated.

The is illumination-lens is shown at F, and consists of a convex or plano-convex lens as large in its diameter as the instrument above described will admit of, which lens is fixed across the sun end of the instrument, as seen in the drawing, so as to converge the direct rays of the sun upon the translucent picture (placed in the box A through the slot 2) from which the required photograph is to be produced upon the paper, which for that purpose has been fixed upon the holder C. By thus applying such a lens in the instrument and hanging the latter upon a stand so that the focal line through the lens or lenses can be brought and kept in direct line with the sun's rays, the translucent negatives picture can be so effectually illuminated as to produce photographic portraits or pictures from the ordinary small-sized negative pictures, even of full life size, in a much shorter time than heretofore, and in the most perfect and beautiful manner.

In lieu of arranging the paper holder upon the board or frame of the instrument so as to be susceptible of being moved toward or away from its tube-box, it may be fixed thereon, and the tube-box arranged so as to be moved toward or away from the paper-holder, or they may be both susceptible of adjustment, the same result being secured by either of the modes; and, furthermore, although I have described one mode in which the instrument is hung so that the focal line of its lens or lenses may be brought and kept in direct line with the sun's rays, it is obvious that there are many other modes or arrangements of parts by which the result can be accomplished without departing from the principle of the present invention, as hereinbefore stated, and therefore I do not intend to limit myself to the precise arrangement herein explained.

I claim—

1. A photographic solar camera swivelled or otherwise jointed so as to permit the axis of the lenses to be adjusted in horizontal and vertical planes in conformity with or approximation to the apparent direction of the sun's rays for the purpose specified.

2. A photograpic solar camera provided with a condensing-lens, F, a negative-holder, a magnifying-lens or combination of lenses and a paper-holder, C, the described portions of the apparatus so arranged having an adjustability in reference to each other, and the apparatus itself being adapted for the direct presentation of the condensing-lens to the sun's rays, whereby the axis of the lenses is made approximately or truly conformable to the direction of the said rays.

The above specification of my reissue signed by me this 16th day of November, 1865.

DAVID SHIVE.

Witnesses:

ALBERT W. BROWN,

C. L. TOPLIFF.